US011405418B2

(12) United States Patent
Yarabolu

(10) Patent No.: US 11,405,418 B2
(45) Date of Patent: Aug. 2, 2022

(54) AUTOMATED DISTRIBUTED DENIAL OF SERVICE ATTACK DETECTION AND PREVENTION

(71) Applicant: BANK OF AMERICA CORPORATION, Charlotte, NC (US)

(72) Inventor: Vijay Kumar Yarabolu, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 198 days.

(21) Appl. No.: 16/902,997

(22) Filed: Jun. 16, 2020

(65) Prior Publication Data

US 2021/0392161 A1 Dec. 16, 2021

(51) Int. Cl.
*H04L 9/40* (2022.01)

(52) U.S. Cl.
CPC .... *H04L 63/1458* (2013.01); *H04L 2463/141* (2013.01)

(58) Field of Classification Search
CPC ............. H04L 63/1458; H04L 2463/141
See application file for complete search history.

(56) References Cited

U.S. PATENT DOCUMENTS

| | | | |
|---|---|---|---|
| 7,584,507 B1 | 9/2009 | Nucci | |
| 7,669,241 B2 | 2/2010 | Ganguly et al. | |
| 8,005,891 B2 | 8/2011 | Knowles et al. | |
| 8,205,253 B2 | 6/2012 | Spatscheck et al. | |
| 8,225,399 B1 | 7/2012 | Van der Merwe | |
| 8,248,946 B2 | 8/2012 | Chao et al. | |
| 8,370,937 B2 | 2/2013 | Gal et al. | |
| 8,423,645 B2 | 4/2013 | Jeffries et al. | |
| 8,438,639 B2 | 5/2013 | Lee et al. | |
| 8,510,826 B1 | 8/2013 | Reams, III et al. | |
| 8,800,039 B2 | 8/2014 | Yoon | |
| 8,869,275 B2 | 10/2014 | Zhao et al. | |
| 8,886,927 B2 | 11/2014 | Jiang | |
| 8,935,785 B2 | 1/2015 | Pandrangi | |
| 8,959,631 B2 | 2/2015 | Beryozkin | |
| 8,966,627 B2 | 2/2015 | Yoon | |
| 9,060,020 B2 | 6/2015 | Iekel-Johnson et al. | |
| 9,060,021 B2 | 6/2015 | Baikalov | |
| 9,167,004 B2 | 10/2015 | Pappu et al. | |
| 9,350,758 B1 | 5/2016 | Aharoni et al. | |
| 9,716,726 B2 | 7/2017 | Pastore et al. | |
| 9,935,974 B2 | 4/2018 | Jain | |
| 10,116,692 B2 | 10/2018 | Huston, III et al. | |
| 10,936,710 B1 * | 3/2021 | Pallemulle | H04L 63/102 |

(Continued)

*Primary Examiner* — Joseph P Hirl
*Assistant Examiner* — Stephen T Gundry

(57) ABSTRACT

A DDOS attack preventer implements an unconventional way of detecting and preventing DDOS attacks. The attack preventer receives and analyzes requests from a particular IP address or device. The attack preventer will track various characteristics of each request (e.g., characteristics of the data in the requests, characteristics of the input used to generate the requests, and characteristics of the device used to generate the requests). The attack preventer will analyze these characteristics to determine whether the requests are human-generated or machine-generated. If the requests are human-generated, the attack preventer services the requests. If the requests are machine-generated, the attack preventer rejects the requests.

20 Claims, 3 Drawing Sheets

(56) References Cited

U.S. PATENT DOCUMENTS

| | | |
|---|---|---|
| 11,133,929 B1 * | 9/2021 | Shahidzadeh ......... H04L 9/0866 |
| 2004/0187032 A1 | 9/2004 | Gels et al. |
| 2008/0127324 A1 | 5/2008 | Seo et al. |
| 2009/0013404 A1 | 1/2009 | Chow et al. |
| 2010/0058471 A1 | 3/2010 | Kim |
| 2011/0138463 A1 | 6/2011 | Kim et al. |
| 2012/0151583 A1 | 6/2012 | Kang et al. |
| 2014/0281530 A1 | 9/2014 | Song et al. |
| 2014/0380457 A1 | 12/2014 | Cassell et al. |
| 2015/0358348 A1 | 12/2015 | Bartlett |
| 2016/0014087 A1 * | 1/2016 | Holloway ........... H04L 63/1466 726/12 |
| 2016/0226896 A1 | 8/2016 | Bhogavilli et al. |
| 2016/0234249 A1 | 8/2016 | Wong |
| 2016/0344765 A1 * | 11/2016 | Shiell ................. H04L 63/1458 |
| 2017/0264638 A1 | 9/2017 | Jain |
| 2017/0324757 A1 | 11/2017 | Al-Shaer et al. |
| 2017/0359359 A1 * | 12/2017 | Jaladi ........................ G06F 8/65 |
| 2017/0359373 A1 * | 12/2017 | Jaladi ................. H04L 63/1416 |
| 2018/0007084 A1 | 1/2018 | Reddy et al. |
| 2018/0091547 A1 * | 3/2018 | St. Pierre ............ H04L 63/1458 |
| 2018/0103047 A1 * | 4/2018 | Turgeman ........... G06Q 20/4014 |
| 2018/0109556 A1 | 4/2018 | Yoo et al. |
| 2018/0152475 A1 | 5/2018 | Park et al. |
| 2018/0255095 A1 | 9/2018 | Doron et al. |
| 2018/0262528 A1 | 9/2018 | Jain |
| 2018/0349583 A1 * | 12/2018 | Turgeman ........ G06Q 20/40145 |
| 2019/0138560 A1 * | 5/2019 | Holloway ........... H04L 61/1511 |
| 2019/0149573 A1 | 5/2019 | Park et al. |
| 2019/0230118 A1 | 7/2019 | Chen |
| 2019/0342326 A1 * | 11/2019 | Jaladi .................. H04L 63/1458 |
| 2020/0242177 A1 * | 7/2020 | Holloway ............... H04L 51/22 |
| 2020/0356667 A1 * | 11/2020 | Rodriguez Bravo ........................ G06F 21/316 |
| 2021/0029137 A1 * | 1/2021 | Wright .................... H04L 63/08 |
| 2021/0031848 A1 * | 2/2021 | Du ........................... B60R 25/32 |
| 2021/0075619 A1 * | 3/2021 | Chereshnev .......... H04L 9/3239 |
| 2021/0110014 A1 * | 4/2021 | Turgeman .......... G06V 40/1365 |
| 2021/0126849 A1 * | 4/2021 | Bikumala .......... H04L 63/0236 |
| 2021/0152555 A1 * | 5/2021 | Djosic .................... G06N 20/00 |
| 2021/0172754 A1 * | 6/2021 | Nunkesser ............... G06N 3/04 |
| 2021/0182370 A1 * | 6/2021 | Melnikov .............. G06N 20/00 |

\* cited by examiner

AUTOMATED DISTRIBUTED DENIAL OF SERVICE ATTACK DETECTION AND PREVENTION

TECHNICAL FIELD

This disclosure relates generally to detecting and preventing distributed denial of service (DDOS) attacks.

BACKGROUND

Distributed denial of service (DDOS) attacks prevent servers from responding to user requests by flooding the servers with fake requests.

SUMMARY OF THE DISCLOSURE

Distributed denial of service (DDOS) attacks prevent servers from responding to user requests by flooding the servers with fake requests. Because it is difficult for the servers to distinguish between the fake requests and the legitimate user requests, the servers attempt to respond to every received request. As a result, the servers become overloaded responding to fake requests and become unresponsive to legitimate user requests. From the users' perspective, the servers will appear unresponsive or slow.

The conventional way of detecting and preventing DDOS attacks is to track the number of requests coming from particular Internet Protocol (IP) addresses or devices. When an IP address or device communicates too many requests over a period of time, the servers may determine that that IP address or device is participating in a DDOS attack. In response, the servers begin rejecting or ignoring requests from that IP address or device. A shortcoming of this conventional solution is that if a sophisticated attacker is able to spoof several IP addresses or devices, then the servers may not be able to detect or prevent the DDOS attack. In a worst case scenario, an attacker can spoof one IP address or device for each request communicated to the servers. The servers will be unable to detect or prevent such a DDOS attack because each IP address or device involved in the attack sends only one request to the servers.

This disclosure contemplates a DDOS attack preventer that implements an unconventional way of detecting and preventing DDOS attacks. The attack preventer receives and analyzes requests from a particular IP address or device. The attack preventer will track various characteristics of each request (e.g., characteristics of the data in the requests, characteristics of the input used to generate the requests, and characteristics of the device used to generate the requests). The attack preventer will analyze these characteristics to determine whether the requests are human-generated or machine-generated. If the requests are human-generated, the attack preventer services the requests. If the requests are machine-generated, the attack preventer rejects the requests. In this manner, the attack preventer provides an improved process for detecting DDOS attacks, even when IP addresses or devices are spoofed well. Additionally, the attack preventer makes it more difficult for an attacker to initiate a DDOS attack, because the attacker will need to take into account additional factors to attempt to trick the attack preventer. Certain embodiments are described below.

According to an embodiment, an apparatus includes a memory and a hardware processor communicatively coupled to the memory. The hardware processor receives a first plurality of requests from a first Internet Protocol (IP) address and receives a second plurality of requests from a second IP address. The hardware processor determines, from the first plurality of requests, a characteristic of data within the first plurality of requests, a characteristic of input used to generate the first plurality of requests, and a characteristic of a device assigned to the first IP address and determines, from the second plurality of requests, a characteristic of data within the second plurality of requests, a characteristic of input used to generate the second plurality of requests, and a characteristic of a device assigned to the second IP address. The hardware processor determines, based on the characteristic of data within the first plurality of requests, the characteristic of input used to generate the first plurality of requests, and the characteristic of the device assigned to the first IP address, that the first plurality of requests was generated by a human user and determines, based on the characteristic of data within the second plurality of requests, the characteristic of input used to generate the second plurality of requests, and the characteristic of the device assigned to the second IP address, that the second plurality of requests was generated by a machine. In response to determining that the first plurality of requests was generated by the human user, the hardware processor services the first plurality of requests. In response to determining that the second plurality of requests was generated by the machine, the hardware processor rejects the second plurality of requests.

According to another embodiment, a method includes receiving, by a hardware processor communicatively coupled to a memory, a first plurality of requests from a first Internet Protocol (IP) address and receiving, by the hardware processor, a second plurality of requests from a second IP address. The method also includes determining, by the hardware processor and from the first plurality of requests, a characteristic of data within the first plurality of requests, a characteristic of input used to generate the first plurality of requests, and a characteristic of a device assigned to the first IP address and determining, by the hardware processor and from the second plurality of requests, a characteristic of data within the second plurality of requests, a characteristic of input used to generate the second plurality of requests, and a characteristic of a device assigned to the second IP address. The method further includes determining, by the hardware processor and based on the characteristic of data within the first plurality of requests, the characteristic of input used to generate the first plurality of requests, and the characteristic of the device assigned to the first IP address, that the first plurality of requests was generated by a human user and determining, by the hardware processor and based on the characteristic of data within the second plurality of requests, the characteristic of input used to generate the second plurality of requests, and the characteristic of the device assigned to the second IP address, that the second plurality of requests was generated by a machine. The method also includes in response to determining that the first plurality of requests was generated by the human user, servicing, by the hardware processor, the first plurality of requests and in response to determining that the second plurality of requests was generated by the machine, rejecting, by the hardware processor, the second plurality of requests.

According to another embodiment, a system includes a first device, a second device, and an attack preventer that includes a hardware processor communicatively coupled to a memory. The hardware processor receives a first plurality of requests from the first device and receives a second plurality of requests from the second device. The hardware processor determines, from the first plurality of requests, a characteristic of data within the first plurality of requests, a characteristic of input used to generate the first plurality of requests, and a characteristic of the first device and determines, from the second plurality of requests, a characteristic of data within the second plurality of requests, a characteristic of input used to generate the second plurality of requests, and a characteristic of the second device. The hardware processor determines, based on the characteristic of data within the first plurality of requests, the characteristic of input used to generate the first plurality of requests, and the characteristic of the first device, that the first plurality of requests was generated by a human user and determines, based on the characteristic of data within the second plurality of requests, the characteristic of input used to generate the second plurality of requests, and the characteristic of the second device, that the second plurality of requests was generated by a machine. In response to determining that the first plurality of requests was generated by the human user, the hardware processor services the first plurality of requests. In response to determining that the second plurality of requests was generated by the machine, the hardware processor rejects the second plurality of requests.

Certain embodiments provide one or more technical advantages. For example, an embodiment provides improved DDOS attack detection when IP addresses or devices are spoofed. As another example, an embodiments makes it more difficult for an attacker to initiate a DDOS attack. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
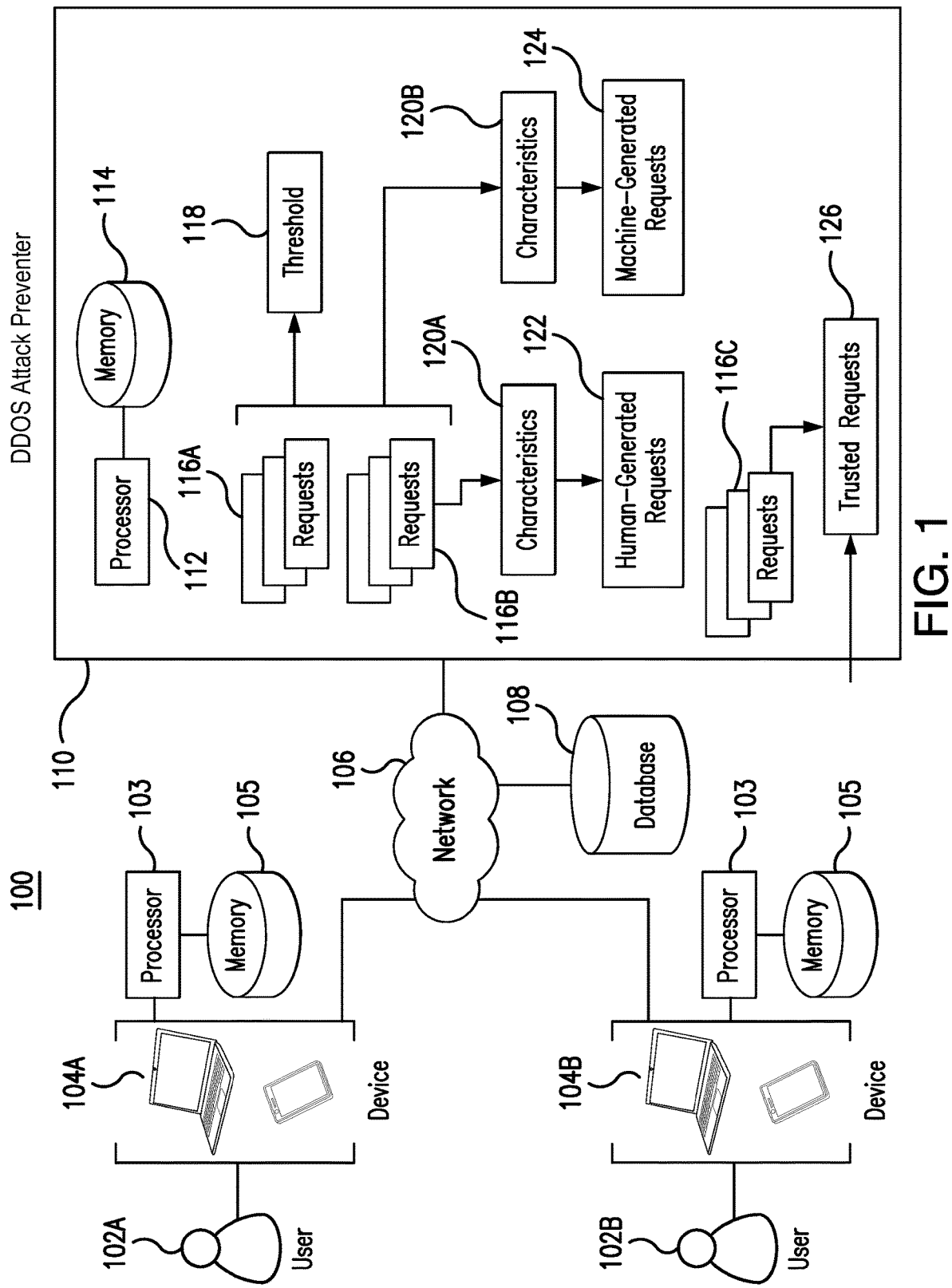
FIG. 1 illustrates an example system.
Figure 2:
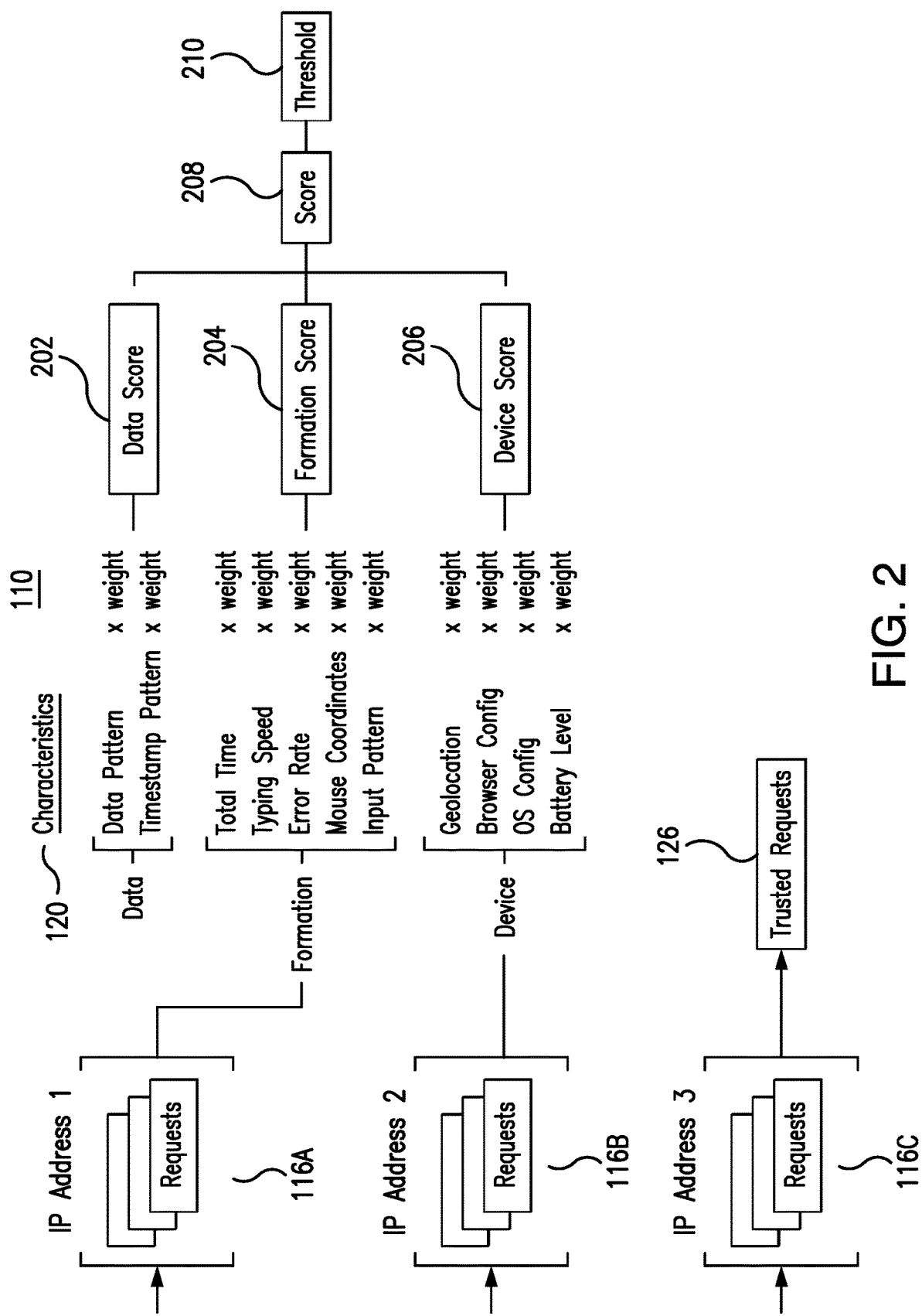
FIG. 2 illustrates an example DDOS attack preventer of the system of FIG. 1.
Figure 3:
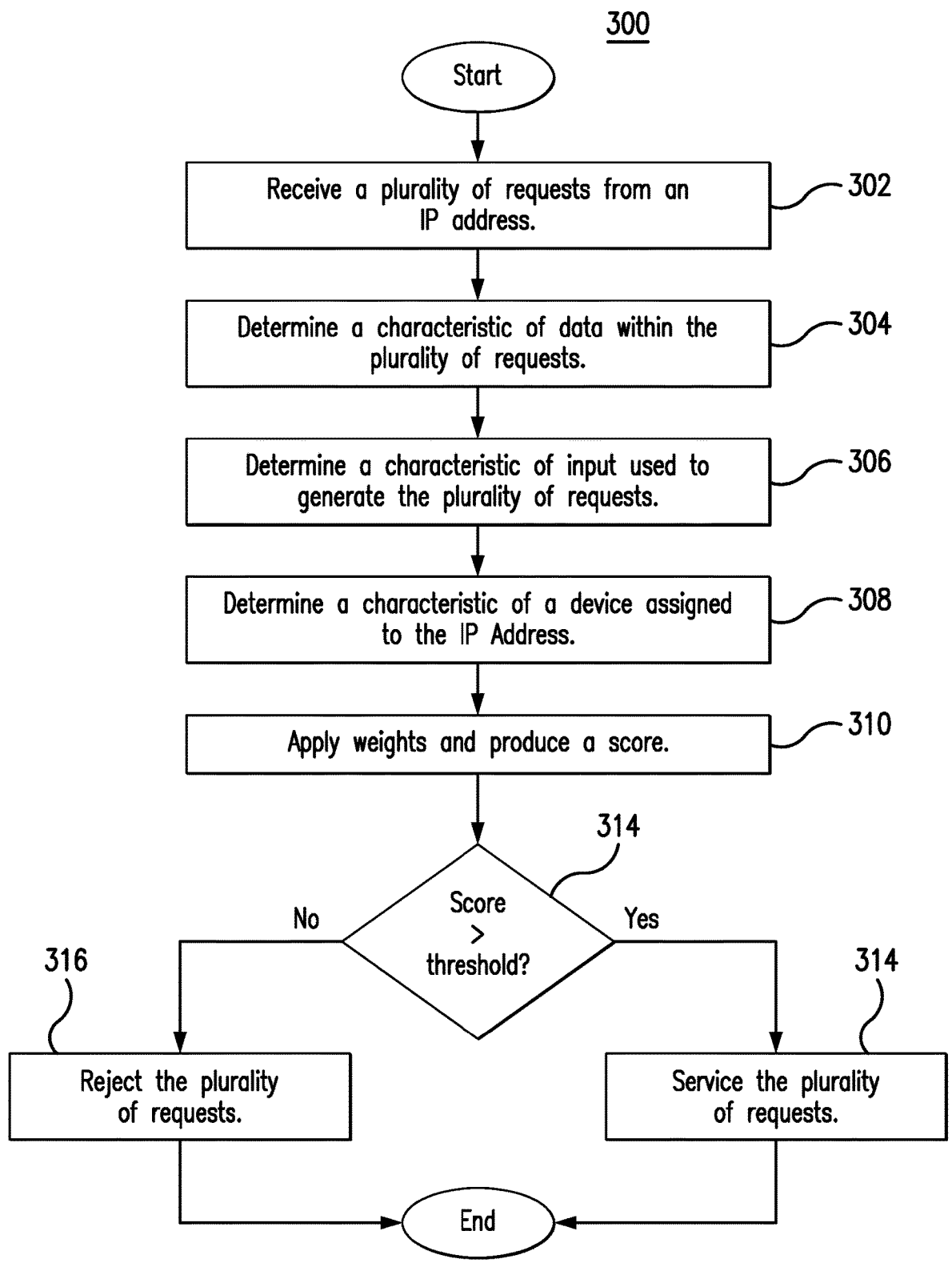
FIG. 3 is a flowchart illustrating a method for detecting and preventing DDOS attacks using the system of FIG. 1.

Embodiments of the present disclosure and its advantages are best understood by referring to FIGS. 1 through 3 of the drawings, like numerals being used for like and corresponding parts of the various drawings.

Distributed denial of service (DDOS) attacks prevent servers from responding to user requests by flooding the servers with fake requests. Because it is difficult for the servers to distinguish between the fake requests and the legitimate user requests, the servers attempt to respond to every received request. As a result, the servers become overloaded responding to fake requests and become unresponsive to legitimate user requests. From the users' perspective, the servers will appear unresponsive or slow.

The conventional way of detecting and preventing DDOS attacks is to track the number of requests coming from particular Internet Protocol (IP) addresses or devices. When an IP address or device communicates too many requests over a period of time, the servers may determine that that IP address or device is participating in a DDOS attack. In response, the servers begin rejecting or ignoring requests from that IP address or device. A shortcoming of this conventional solution is that if a sophisticated attacker is able to spoof several IP addresses or devices, then the servers may not be able to detect or prevent the DDOS attack. In a worst case scenario, an attacker can spoof one IP address or device for each request communicated to the servers. The servers will be unable to detect or prevent such a DDOS attack because each IP address or device involved in the attack sends only one request to the servers.

This disclosure contemplates a DDOS attack preventer that implements an unconventional way of detecting and preventing DDOS attacks. The attack preventer receives and analyzes requests from a particular IP address or device. The attack preventer will track various characteristics of each request (e.g., characteristics of the data in the requests, characteristics of the input used to generate the requests, and characteristics of the device used to generate the requests). The attack preventer will analyze these characteristics to determine whether the requests are human-generated or machine-generated. If the requests are human-generated, the attack preventer services the requests. If the requests are machine-generated, the attack preventer rejects the requests. In this manner, the attack preventer provides an improved process for detecting DDOS attacks, even when IP addresses or devices are spoofed well. Additionally, the attack preventer makes it more difficult for an attacker to initiate a DDOS attack, because the attacker will need to take into account additional factors to attempt to trick the attack preventer.

A practical application of the DDOS attack preventer is that it detects and prevents DDOS attacks even when the IP addresses or devices involved in the attack are spoofed well. In this manner, it becomes more difficult for attackers to initiate DDOS attacks and DDOS attacks can be stopped before they overload servers. The system will be described in more detail using FIGS. 1 through 3.

FIG. 1 illustrates an example system 100. As seen in FIG. 1 system 100 includes one or more devices 104, a network 106, a database 108, and a DDOS attack preventer 110. Generally, system 100 detects and prevents DDOS attacks by considering characteristics of requests coming from particular devices 104 rather than merely the number of requests coming from a device 104. In this manner, system 100 detects and prevents DDOS attacks even when IP addresses and/or devices 104 are spoofed well in certain embodiments.

Users 102 use devices 104 to communicate with other components of system 100. For example, user 102 may use a device 104 to communicate requests for services from other components of system 100. System 100 includes devices 104A and devices 104B. User 102A may use devices 104A to interact with components of system 100. User 102B may use devices 104B to interact with components of system 100. This disclosure contemplates system 100 including any suitable number of users 102 using any suitable number of devices 104. Each device 104 includes a hardware processor 103 and a memory 105. This disclosure contemplates processor 103 and memory 105 being configured to perform any of the functions or actions of a device 104 described herein. System 100 may include any suitable number of devices 104 and users 102. Any number of users 102 may be malicious users 102 who use devices 104 to perform DDOS attacks.

Devices 104 include any appropriate device for communicating with components of system 100 over network 106. For example, devices 104 may be a telephone, a mobile phone, a computer, a laptop, a tablet, an automated assistant, and/or a cash register. This disclosure contemplates device 104 being any appropriate device for sending and receiving communications over network 106. As an example and not by way of limitation, device 104 may be a computer, a laptop, a wireless or cellular telephone, an electronic notebook, a personal digital assistant, a tablet, or any other device capable of receiving, processing, storing, and/or communicating information with other components of system 100. Device 104 may also include a user interface, such as a display, a microphone, keypad, or other appropriate terminal equipment usable by user 102. Device 104 may include a hardware processor, memory, and/or circuitry configured to perform any of the functions or actions of device 104 described herein. For example, a software application designed using software code may be stored in the memory and executed by the processor to perform the functions of device 104.

Processor 103 is any electronic circuitry, including, but not limited to microprocessors, application specific integrated circuits (ASIC), application specific instruction set processor (ASIP), and/or state machines, that communicatively couples to memory 105 and controls the operation of device 104. Processor 103 may be 8-bit, 16-bit, 32-bit, 64-bit or of any other suitable architecture. Processor 103 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 103 may include other hardware that operates software to control and process information. Processor 103 executes software stored on memory to perform any of the functions described herein. Processor 103 controls the operation and administration of device 104 by processing information received from devices 104, network 106, and memory 105. Processor 103 may be a programmable logic device, a microcontroller, a microprocessor, any suitable processing device, or any suitable combination of the preceding. Processor 103 is not limited to a single processing device and may encompass multiple processing devices.

Memory 105 may store, either permanently or temporarily, data, operational software, or other information for processor 103. Memory 105 may include any one or a combination of volatile or non-volatile local or remote devices suitable for storing information. For example, memory 105 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 105, a disk, a CD, or a flash drive. In particular embodiments, the software may include an application executable by processor 103 to perform one or more of the functions described herein.

Network 106 allows communication between and amongst the various components of system 100. For example, user 102 may use devices 104 to communicate over network 106. This disclosure contemplates network 106 being any suitable network operable to facilitate communication between the components of system 100. Network 106 may include any interconnecting system capable of transmitting audio, video, signals, data, messages, or any combination of the preceding. Network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Database 108 may store credentials for certain users 102 and/or devices 104. For example, database 108 may store user names, account names, IP addresses, map addresses and/or any other suitable identifier for trusted users 102 and/or devices 104. When a request comes from a trusted user 102 or trusted device 104 these requests may be treated as legitimate requests and serviced. Reference may be made to the various identifiers stored in database 108 to determine whether a request is coming from a trusted user 102 or a trusted device 104.

In some instances, a user 102 may be a malicious user who spoofs devices 104 and/or IP addresses to conduct a DDOS attack on system 100. During these attacks, the malicious user 102 uses the spoofed devices 104 and/or IP addresses to flood a server with fake requests. As the number of fake requests grow, the server may be unable to respond to legitimate requests. As a result, users 102 that send legitimate requests to the server may perceive the server as being unresponsive or slow. In the example of FIG. 1, user 102A may be a legitimate user who uses devices 104A to communicate legitimate requests to other components of system 100 while user 102B may be a malicious user who uses one or more devices 104B to communicate fake requests to other components of system 100 (e.g., to perform a DDOS attack). In some instances, user 102B may have spoofed one or more devices 104B to conduct a DDOS attack.

In conventional systems, DDOS attacks are detected and prevented by tracking the number of requests coming from a particular IP address or device 104. If the IP address or device 104 communicates too many requests within a particular span of time, then, the server may begin ignoring or discarding the requests from that IP address or device 104. This conventional manner of detecting and preventing DDOS attacks is vulnerable to one or more technical challenges. For example, if a malicious user spoofs many IP addresses or devices 104 to conduct the DDOS attack, then the server may be unable to detect or prevent the DDOS attack because none of the IP addresses or devices 104 would be communicating many requests to the server during a particular span of time. In a worst case scenario, if a malicious user spoofs one IP address or device 104 for each request communicated during the DDOS attack, then the server will not be able to distinguish between legitimate requests and fake requests using the conventional approach. As a result, the DDOS attack goes undetected and renders the server unresponsive.

DDOS attack preventer 110 implements an unconventional process for detecting and preventing DDOS attacks. Generally, attack preventer 110 analyzes characteristics of user 102, device 104, and/or data within a received request to determine whether the request is legitimate or fake. In this manner, attack preventer 110 detects and prevents DDOS attacks even when many IP addresses and/or devices 104 are spoofed, in particular embodiments. In the example in FIG. 1, DDOS attack preventer 110 includes a hardware processor 112 and a memory 114. This disclosure contemplates processor 112 and memory 114 being configured to perform any of the functions and actions of DDOS attack preventer 110 described herein. In particular embodiments, attack preventer 110 is implemented as part of a larger component in system 100, such as, for example, a firewall of network 106 and/or a server that services requests.

Processor 112 is any electronic circuitry, including, but not limited to microprocessors, application specific integrated circuits (ASIC), application specific instruction set processor (ASIP), and/or state machines, that communicatively couples to memory 114 and controls the operation of attack preventer 110. Processor 112 may be 8-bit, 16-bit, 32-bit, 64-bit or of any other suitable architecture. Processor 112 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 112 may include other hardware that operates software to control and process information. Processor 112 executes software stored on memory to perform any of the functions described herein. Processor 112 controls the operation and administration of attack preventer 110 by processing information received from devices 104, network 106, and memory 114. Processor 112 may be a programmable logic device, a microcontroller, a microprocessor, any suitable processing device, or any suitable combination of the preceding. Processor 112 is not limited to a single processing device and may encompass multiple processing devices. Memory 114 may store, either permanently or temporarily, data, operational software, or other information for processor 112. Memory 114 may include any one or a combination of volatile or non-volatile local or remote devices suitable for storing information. For example, memory 114 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 114, a disk, a CD, or a flash drive. In particular embodiments, the software may include an application executable by processor 112 to perform one or more of the functions described herein.

Attack preventer 110 receives requests 116 from devices 104. Each request 116 may seek the provision of a service from any component of system 100 such as, for example, attack preventer 110 and/or a server. Attack preventer 110 may analyze the information contained within requests 116 to determine whether requests 116 are legitimate requests or fake requests. In other words, attack preventer 110 does not merely count the number of requests 116 coming from a device 104 or IP address to determine whether those requests 116 are legitimate or fake. Attack preventer 110 services the requests 116 that are determined to be legitimate and rejects or ignores the requests 116 and that are determined to be fake.

In particular embodiments, attack preventer 110 compares the number of requests 116 received during a span of time to a threshold 118. If the total number of requests 116 do not exceed threshold 118, then attack preventer 110 may service every request 116 received without determining whether the requests 116 are legitimate or fake. If the total number of requests 116 exceeds threshold 118, then attack preventer 110 analyzes the information within requests 116 to determine whether the requests 116 are legitimate or fake. Attack preventer 110 then services the legitimate requests 116 while rejecting or ignoring the fake requests 116. In this manner, threshold 118 acts as a limit above which attack preventer 110 begins to consider the possibility of a DDOS attack. Threshold 118 may be set to a number of requests above which attack preventer 110 and/or server will begin experiencing a noticeable slowdown when servicing all incoming requests 116. Threshold 118 may be set based on the processing, memory, and/or network capabilities of system 100.

Attack preventer 110 groups requests 116 based on the IP address and/or devices 104 that generated the requests 116. In the example of FIG. 1, attack preventer 110 groups requests 116 into requests 116A, requests 116B, and requests 116C. Requests 116A may have been generated by devices 104A, while requests 116B may have been generated by devices 104B. Attack preventer 110 analyzes the information within these groups of requests 116 to determine whether the requests 116 are legitimate or fake. Requests 116C may have come from device 104A, 104B, or another unillustrated device 104.

Attack preventer 110 examines characteristics 120 within the requests 116 to determine whether the requests 116 are legitimate or fake. Generally, attack preventer 110 considers one or more categories of characteristics 120, such as, for example, characteristics of the data contained within requests 116, characteristics of the input used to generate the requests 116, and/or characteristics of the device 104 used to generate the requests 116. By examining these characteristics 120 attack preventer 110 may be able to determine whether the requests 116 corresponding to those characteristics 120 are legitimate or fake. In the example of FIG. 1, attack preventer 110 analyzes characteristics 120A of request 116A and characteristics 120B of request 116B to determine whether these requests 116 are legitimate or fake. Certain characteristics 120 (e.g., characteristics of input used to generate requests 116 and/or characteristics of devices 104 used to generate requests 116) may be collected by device 104 as requests 116 are being generated. Device 104 then inserts these collected characteristics 120 into requests 116 before communicating requests 116 to attack preventer 110. In particular embodiments, to conserve processing, memory, and network resources, devices 104 do not collect these characteristics 120 unless attack preventer 110 indicates to devices 104 that the number of requests 116 exceeds threshold 118. A more detailed description of characteristics 120 and how they are analyzed is provided in FIG. 2.

Attack preventer 110 may determine that request 116A are human-generated requests 122 after examining characteristics 120A. In response, attack preventer 110 may determine that request 116A should be serviced. As a result, attack preventer 110 services human-generated request 122. For example, attack preventer 110 may prepare responses to human-generated requests 122. As another example, attack preventer 110 may communicate human-generated request 122 to a server that prepares responses to human generated requests 122.

Attack preventer 110 may determine that requests 116B are machine-generated requests 124 by analyzing characteristics 120B. In other words, attack preventer 110 may determine that requests 116B are fake requests. As a result, attack preventer 110 rejects and/or ignores machine generated requests 124.

In particular embodiments, attack preventer 110 may determine that requests 116C are trusted requests 126 by comparing information within requests 116C to information stored in database 108. For example, requests 116C may include information that identifies the user 102 or device 104 that generated requests 116C as being a trusted user 102 or trusted device 104. As a result, attack preventer 110 determines that requests 116C are trusted requests 126. Attack preventer 110 then services trusted requests 126 by preparing responses to trusted requests 126 or by communicating trusted requests 126 to a server that prepares responses to trusted requests 126. In this manner, attack preventer 110 may service requests 116C without analyzing characteristics 120 within requests 116C.

FIG. 2 illustrates an example DDOS attack preventer 110 in the system 100 of FIG. 1. Generally, attack preventer 110 analyzes characteristics 120 of received requests 116 to determine whether the requests 116 are legitimate or fake. Attack preventer 110 then services the legitimate request 116 and rejects or ignores the fake requests 116. In this manner, attack preventer 110 detects and prevents DDOS attacks even when IP addresses or devices 104 are spoofed well in certain embodiments.

Attack preventer 110 receives requests 116 from various IP addresses and/or devices 104. In the example of FIG. 2, attack preventer 110 receives a request 116A from an IP address 1, requests 116B from an IP address 2, and requests 116C from an IP address 3. Requests 116A, 116B, and 116C may include requests for services for attack preventer 110 and/or other components of system 100. Attack preventer 110 analyzes information contained within these requests 116 to determine whether these requests 116 are legitimate or fake.

Attack preventer 110 analyzes characteristics 120 of received requests 116. Generally, attack preventer 110 analyzes three categories of characteristics 120 of the request 116. These categories include data characteristics, formation characteristics, and device characteristics. Attack preventer 110 analyzes these characteristics 120 to produce scores that are analyzed to determine whether requests 116 are legitimate or fake.

Data characteristics 120 include various aspects of the data and information included within requests 116. For example, data characteristics 120 may include patterns within the data (e.g., the payload) in requests 116 and patterns within the timestamps in requests 116. By analyzing these patterns, it can be determined whether requests 116 are being generated by a machine rather than a human. For example, a data pattern analysis may show that the same data is being generated and sent across multiple requests 116 (e.g., multiple requests 116 all including the same piece of data). As another example, a data pattern analysis may show that consecutive data is being generated and sent through multiple requests 116 (e.g., multiple requests 116 including data that includes a numerical pattern). A timestamp pattern analysis may show that requests 116 are being sent periodically from a particular IP address or device 104. Timestamp pattern analysis may also reveal that multiple requests from one or more IP addresses or devices 104 are being sent at the same time. If requests 116 are being generated by a human, then the expectation would be that there would be minimal to no patterns within the data in requests 116 or the timestamps in requests 116. When patterns in the data and/or timestamps begin to emerge, it may be an indicator that requests 116 are being generated by a machine.

Formation characteristics 120 reveal aspects of the input used to generate requests 116. For example, formation characteristics 120 may include the total time taken to generate and communicate a request 116, a typing speed used to generate a request 116, an error rate of the input for generating requests 116, mouse coordinates used to generate a request 116, and/or an input pattern to generate a request 116. Analyzing these formation characteristics 120 may reveal whether requests 116 are being generated by a human or a machine. For example, if the total time taken to generate request 116 is consistently the same across multiple requests 116, then it may be the case that these requests 116 are being generated by a machine. Additionally, if the typing speed used to generate multiple requests 116 is far too fast for a human to have typed the request 116 or if the typing speed across multiple requests 116 is the same, then the typing speed may be an indicator that the requests 116 were generated by a machine. As another example, if the error rate in generating requests 116 is consistent across requests 116, then the error rate may be an indicator that requests 116 were generated by a machine rather than a human. As yet another example, if the mouse coordinates used to generate request 116 are consistently the same across requests 116 (e.g., the same pixel of a button is clicked each time a request 116 is generated), then the mouse coordinates may indicate that the request 116 are generated by a machine rather than a human. As yet another example, if there is a pattern in the input used to generate request 116 such as, for example, repetitive keystrokes and/or button presses, then the pattern may indicate that request 116 are generated by a machine rather than a human. If request 116 are generated by a human, one would expect that the total time, typing speed, error rate, and mouse coordinates would vary between requests 116 and that input patterns would be minimized. If these characteristics 120 are consistent across requests 116, then these characteristics 120 may indicate that the request 116 are generated by a machine rather than a human.

Device characteristics 120 indicate aspects of the devices 104 used to generate requests 116. For example, device characteristics 120 include a geolocation of a device 104, a browser configuration of a device 104, an operating system configuration of a device 104, and/or a battery level of a device 104. Device characteristics 120 may be analyzed across requests 116 from multiple IP addresses and or devices 104. If a human were generating these requests 116, then device characteristics 120 should vary across different IP addresses and/or devices 104. If request 116 are being generated by spoofed devices 104 and/or IP addresses, then devices characteristics 120 may be the same across different requests 116 generated by different IP addresses and/or devices 104. For example, if different devices 104 generated legitimate requests 116, then the geolocation, browser configuration, operating system configuration, and battery level of these devices 104 should be different across time. If the geolocation, browser configuration, operating system configuration, and battery level of these devices 104 are the same across multiple requests 116 and across different spans of time, then it may be determined that the request 116 are being generated by the same device 104, which means that these requests 116 are likely fake.

Characteristics 120 may be collected by devices 104 that communicate requests 116 to attack preventer 110. In particular embodiments, these devices 104 may not collect characteristics 120 until the total number of requests 116 received by attack preventer 120 exceed threshold 118. For example, a device 104 may collect information about the input used to generate request 116 such as typing speeds, error rates, and mouse coordinates. As another example, device 104 may collect device characteristics such as the geolocation of the device 104, browser and operating configuration systems, and/or battery levels of the device 104. Device 104 may include this information in each request 116 so that attack preventer 110 can retrieve this information from each request 116 to determine whether the request 116 is legitimate or fake.

Attack preventer 110 may apply weights to each characteristic 120 depending on the relative importance of that particular characteristic 120 in determining whether a request is legitimate or fake. This disclosure contemplates attack preventer 110 applying any suitable weight to any suitable characteristic 120. After applying weights 120 to each characteristic 120, attack preventer 110 generates various scores for each category of characteristics 110. In the example of FIG. 2, attack preventer 110 generates a data score 202 a formation score 204, and a device score 206. Data score 202 is formed by summing the weighted data pattern and time stamp pattern of data characteristics 120. Formation score 204 is formed by summing the weighted total time, typing speed, error rate, mouse coordinates, and input pattern of formation characteristics 120. Device score 206 is formed by summing the weighted geolocation, browser configuration, operating system configuration, and battery level of device characteristics 120. Each of the individual characteristic scores may indicate how varied or identical these characteristics 120 are across various requests 116. In certain embodiments, attack preventer 110 may further apply a bias to any of these scores to adjust their values relative to a bias value.

Attack preventer 110 then sums data score 202, formation score 204, and device score 206 to produce a total score 208. Attack preventer 110 then compares total score 208 to a threshold 210 to determine whether request 116 are legitimate or fake, for example, attack preventer 110 may compare score 208 to threshold 210 to determine that certain requests 116 are generated by a human and are therefore legitimate and should be serviced. As another example, attack preventer 110 may compare score 208 to threshold 210 to determine a certain requests 116 are generated by a machine and are therefore fake and should be rejected or ignored.

As an operating example, attack preventer 110 may receive requests 116A from a first IP address or device 104A. Attack preventer 110 may extract information within requests 116A to analyze various characteristics 120 of request 116A. Attack preventer 110 may determine that the data characteristics 120 reveal that requests 116 include varied data and varied timestamps. Attack preventer 110 may analyze formation characteristics 120 to determine that the total time it took to generate requests 116A varies across the requests 116A and that the typing speed, error rate, and mouse coordinates used to generate requests 116A varies across the requests 116A. Attack preventer 110 may also determine that the geolocation, browser configuration, operating system configuration, and battery level of device 104A used to generate request 116A varies from other devices 104 used to generate other request 116 received by attack preventer 110. Based on this analysis, attack preventer 110 may generate data score 202, formation score 204, device score 206, and/or total score 208. Comparing total score 208 to threshold 210 may reveal that requests 116A are generated by a human. In response, attack preventer 110 services requests 116A.

As another example, requests 116B may be generated by a spoofed IP address and/or device 104B by a malicious user 102B seeking to conduct a DDOS attack. Attack preventer 110 may analyze information within requests 116B to determine characteristics 120. Attack preventer 110 may determine that there exists a pattern in the data of requests 116B and/or the timestamps of requests 116B. Attack preventer 110 may also determine that the total time, typing speed, error rate, and/or mouse coordinates of the input used to generate requests 116B is fairly consistent across all of the requests 116B. Additionally, attack preventer 110 may determine that the geolocation, browser configuration, operating system configuration, and/or battery level of the device 104B is the same with other devices 104 sending requests 116 to attack preventer 110. Based on this information, attack preventer 110 generates data score 202, formation score 204, device score 206, and total score 208 for requests 116B. By comparing score 208 to threshold 210, attack preventer 110 may determine that requests 116B are generated by a machine and are therefore likely fake. In response, attack preventer 110 may reject and/or ignore requests 116B.

In particular embodiments, attack preventer 110 may determine whether requests 116C are trusted requests 126 by comparing identifying information within requests 116C to information stored within database 108. As explained previously, database 108 may store identifying information for trusted users 102 and/or devices 104. Attack preventer 110 may compare identifying information in requests 116C with the information in database 108 to determine that requests 116C are being generated by a trusted user 102 and/or device 104. In response, attack preventer 110 determines that requests 116C are trusted requests 126. Attack preventer 110 then services trusted requests 126 without analyzing the characteristics 120 discussed previously.

FIG. 3 is a flowchart illustrating a method 300 for detecting and preventing DDOS attacks using the system 100 of FIG. 1. Generally, attack preventer 110 performs the steps of method 300. In particular embodiments, by performing method 300, attack preventer 110 detects and prevents DDOS attacks even when many IP addresses and/or devices 104 are spoofed.

Attack preventer 110 begins by receiving a plurality of requests 116 from an IP address in step 302. In step 304, attack preventer 110 determines a characteristic 120 of data within the plurality of requests 116. For example, these characteristics 120 may include data patterns and/or timestamp patterns. In step 306, attack preventer 110 determines the characteristic 120 of input used to generate the plurality of requests 116. For example, these characteristics 120 may include the total time it took to generate these requests 116, the typing speed used to generate these requests 116, error rates of the input used to generate these requests 116, mouse coordinates used to generate these requests 116, and/or any input pattern in the input used to generate these requests 116. In step 308, attack preventer 110 determines a characteristic 120 of a device 104 assigned to the IP address. These characteristics 120 may include a geolocation, a browser configuration, an operating system configuration, and/or a battery level of the device 104 used to generate these requests 116. In step 310, attack preventer 110 applies weights to these characteristics 120 to produce a total score 208.

Attack preventer 110 then compares the score 208 to a threshold 210 in step 312. If the score 208 exceeds the threshold 210, then attack preventer 110 may determine that the requests 116 are legitimate and generated by a human. In response, attack preventer 110 services the plurality of requests 116 in step 314. If score 208 does not exceed threshold 210, attack preventer 110 may determine that the requests 116 are generated by a machine and are likely fake. In response, attack preventer 110 rejects the plurality of requests 116 in step 316.

Modifications, additions, or omissions may be made to method 300 depicted in FIG. 3. Method 300 may include more, fewer, or other steps. For example, steps may be performed in parallel or in any suitable order. While discussed as navigation attack preventer 110 performing the steps, any suitable component of system 100, such as device(s) 104 for example, may perform one or more steps of the methods.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
   a memory; and
   a hardware processor communicatively coupled to the memory, the hardware processor configured to:
   receive a first plurality of requests from a first Internet Protocol (IP) address;
   receive a second plurality of requests from a second IP address;
   determine, from the first plurality of requests, a characteristic of data within the first plurality of requests, a characteristic of input used to generate the first plurality of requests, and a characteristic of a device assigned to the first IP address, wherein:
   the characteristic of the device assigned to the first IP address comprises a first browser configuration of the device assigned to the first IP address; and
   determining the characteristic of the device assigned to the first IP address comprises determining the first browser configuration of the device assigned to the first IP address;
   determine, from the second plurality of requests, a characteristic of data within the second plurality of requests, a characteristic of input used to generate the second plurality of requests, and a characteristic of a device assigned to the second IP address, wherein:
   the characteristic of the device assigned to the second IP address comprises a second browser configuration of the device assigned to the second IP address; and
   determining the characteristic of the device assigned to the second IP address comprises determining the second browser configuration of the device assigned to the second IP address;
   determine, based on the characteristic of data within the first plurality of requests, the characteristic of input used to generate the first plurality of requests, and the characteristic of the device assigned to the first IP address, that the first plurality of requests was generated by a human user;
   determine, based on the characteristic of data within the second plurality of requests, the characteristic of input used to generate the second plurality of requests, and the characteristic of the device assigned to the second IP address, that the second plurality of requests was generated by a machine;
   in response to determining that the first plurality of requests was generated by the human user, service the first plurality of requests; and
   in response to determining that the second plurality of requests was generated by the machine, reject the second plurality of requests.

2. The apparatus of claim 1, wherein determining that the second plurality of requests was generated by a machine comprises:
   weighting the characteristic of data within the second plurality of requests with a first weight to produce a first weighted score;
   weighting the characteristic of input used to generate the second plurality of requests to produce a second weighted score;
   weighting the characteristic of the device assigned to the second IP address to produce a third weighted score;
   adding the first, second, and third weighted scores to produce a total score; and
   determining that the total score exceeds a threshold.

3. The apparatus of claim 1, wherein determining the characteristic of data within the first plurality of requests is performed in response to a determination that a total number of received requests exceeds a threshold.

4. The apparatus of claim 1, wherein determining the characteristic of data within the first plurality of requests comprises determining at least one of a pattern within the data within the first plurality of requests and a pattern of timestamps within the first plurality of requests.

5. The apparatus of claim 1, wherein determining the characteristic of input used to generate the first plurality of requests comprises determining at least one of a total time that it took to provide the input used to generate the first plurality of requests, a typing speed corresponding to the input used to generate the first plurality of requests, an error rate corresponding to the input used to generate the first plurality of requests, mouse coordinates corresponding to the input used to generate the first plurality of requests, and a pattern within the input used to generate the first plurality of requests.

6. The apparatus of claim 1, wherein determining the characteristic of the device assigned to the first IP address comprises determining at least one of a geolocation of the device assigned to the first IP address, an operating system configuration of the device assigned to the first IP address, and a battery level of the device assigned to the first IP address.

7. The apparatus of claim 1, the hardware processor further configured to:
   receive a third plurality of requests from a third IP address;
   determine that the third IP address is stored within a database; and
   in response to determining that the third IP address is stored within the database, service the third plurality of requests.

8. A method comprising:
   receiving, by a hardware processor communicatively coupled to a memory, a first plurality of requests from a first Internet Protocol (IP) address;
   receiving, by the hardware processor, a second plurality of requests from a second IP address;
   determining, by the hardware processor and from the first plurality of requests, a characteristic of data within the first plurality of requests, a characteristic of input used to generate the first plurality of requests, and a characteristic of a device assigned to the first IP address, wherein:
   the characteristic of the device assigned to the first IP address comprises a first browser configuration of the device assigned to the first IP address; and
   determining the characteristic of the device assigned to the first IP address comprises determining the first browser configuration of the device assigned to the first IP address;

determining, by the hardware processor and from the second plurality of requests, a characteristic of data within the second plurality of requests, a characteristic of input used to generate the second plurality of requests, and a characteristic of a device assigned to the second IP address, wherein:
  the characteristic of the device assigned to the second IP address comprises a second browser configuration of the device assigned to the second IP address; and
  determining the characteristic of the device assigned to the second IP address comprises determining the second browser configuration of the device assigned to the second IP address;
determining, by the hardware processor and based on the characteristic of data within the first plurality of requests, the characteristic of input used to generate the first plurality of requests, and the characteristic of the device assigned to the first IP address, that the first plurality of requests was generated by a human user;
determining, by the hardware processor and based on the characteristic of data within the second plurality of requests, the characteristic of input used to generate the second plurality of requests, and the characteristic of the device assigned to the second IP address, that the second plurality of requests was generated by a machine;
in response to determining that the first plurality of requests was generated by the human user, servicing, by the hardware processor, the first plurality of requests; and
in response to determining that the second plurality of requests was generated by the machine, rejecting, by the hardware processor, the second plurality of requests.

9. The method of claim 8, wherein determining that the second plurality of requests was generated by a machine comprises:
  weighting the characteristic of data within the second plurality of requests with a first weight to produce a first weighted score;
  weighting the characteristic of input used to generate the second plurality of requests to produce a second weighted score;
  weighting the characteristic of the device assigned to the second IP address to produce a third weighted score;
  adding the first, second, and third weighted scores to produce a total score; and
  determining that the total score exceeds a threshold.

10. The method of claim 8, wherein determining the characteristic of data within the first plurality of requests is performed in response to a determination that a total number of received requests exceeds a threshold.

11. The method of claim 8, wherein determining the characteristic of data within the first plurality of requests comprises determining at least one of a pattern within the data within the first plurality of requests and a pattern of timestamps within the first plurality of requests.

12. The method of claim 8, wherein determining the characteristic of input used to generate the first plurality of requests comprises determining at least one of a total time that it took to provide the input used to generate the first plurality of requests, a typing speed corresponding to the input used to generate the first plurality of requests, an error rate corresponding to the input used to generate the first plurality of requests, mouse coordinates corresponding to the input used to generate the first plurality of requests, and a pattern within the input used to generate the first plurality of requests.

13. The method of claim 8, wherein determining the characteristic of the device assigned to the first IP address comprises determining at least one of a geolocation of the device assigned to the first IP address, an operating system configuration of the device assigned to the first IP address, and a battery level of the device assigned to the first IP address.

14. The method of claim 8, further comprising:
  receiving, by the hardware processor, a third plurality of requests from a third IP address;
  determining, by the hardware processor, that the third IP address is stored within a database; and
  in response to determining that the third IP address is stored within the database, servicing, by the hardware processor, the third plurality of requests.

15. A system comprising:
  a first device assigned a first Internet Protocol (IP) address;
  a second device assigned a second IP address; and
  an attack preventer comprising a hardware processor communicatively coupled to a memory, the hardware processor configured to:
    receive a first plurality of requests from the first device;
    receive a second plurality of requests from the second device;
    determine, from the first plurality of requests, a characteristic of data within the first plurality of requests, a characteristic of input used to generate the first plurality of requests, and a characteristic of the first device, wherein:
      the characteristic of the device assigned to the first IP address comprises a first browser configuration of the device assigned to the first IP address; and
      determining the characteristic of the device assigned to the first IP address comprises determining the first browser configuration of the device assigned to the first IP address;
    determine, from the second plurality of requests, a characteristic of data within the second plurality of requests, a characteristic of input used to generate the second plurality of requests, and a characteristic of the second device, wherein:
      the characteristic of the device assigned to the second IP address comprises a second browser configuration of the device assigned to the second IP address; and
      determining the characteristic of the device assigned to the second IP address comprises determining the second browser configuration of the device assigned to the second IP address;
    determine, based on the characteristic of data within the first plurality of requests, the characteristic of input used to generate the first plurality of requests, and the characteristic of the first device, that the first plurality of requests was generated by a human user;
    determine, based on the characteristic of data within the second plurality of requests, the characteristic of input used to generate the second plurality of requests, and the characteristic of the second device, that the second plurality of requests was generated by a machine;
    in response to determining that the first plurality of requests was generated by the human user, service the first plurality of requests; and in response to determining that the second plurality of requests was generated by the machine, reject the second plurality of requests.

16. The system of claim 15, wherein determining that the second plurality of requests was generated by a machine comprises:
weighting the characteristic of data within the second plurality of requests with a first weight to produce a first weighted score;
weighting the characteristic of input used to generate the second plurality of requests to produce a second weighted score;
weighting the characteristic of the device assigned to the second IP address to produce a third weighted score;
adding the first, second, and third weighted scores to produce a total score; and
determining that the total score exceeds a threshold.

17. The system of claim 15, wherein determining the characteristic of data within the first plurality of requests is performed in response to a determination that a total number of received requests exceeds a threshold.

18. The system of claim 15, wherein determining the characteristic of data within the first plurality of requests comprises determining at least one of a pattern within the data within the first plurality of requests and a pattern of timestamps within the first plurality of requests.

19. The system of claim 15, wherein determining the characteristic of input used to generate the first plurality of requests comprises determining at least one of a total time that it took to provide the input used to generate the first plurality of requests, a typing speed corresponding to the input used to generate the first plurality of requests, an error rate corresponding to the input used to generate the first plurality of requests, mouse coordinates corresponding to the input used to generate the first plurality of requests, and a pattern within the input used to generate the first plurality of requests.

20. The system of claim 15, wherein determining the characteristic of the device assigned to the first IP address comprises determining at least one of a geolocation of the device assigned to the first IP address, an operating system configuration of the device assigned to the first IP address, and a battery level of the device assigned to the first IP address.

* * * * *